Jan. 29, 1929.
J. W. COX
1,700,195
CONDUIT FITTING
Filed Feb. 17, 1925
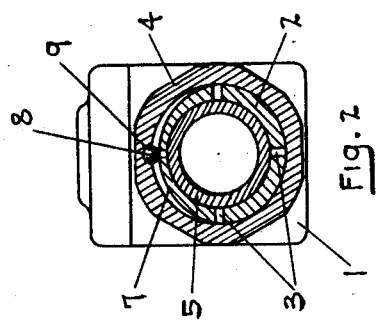
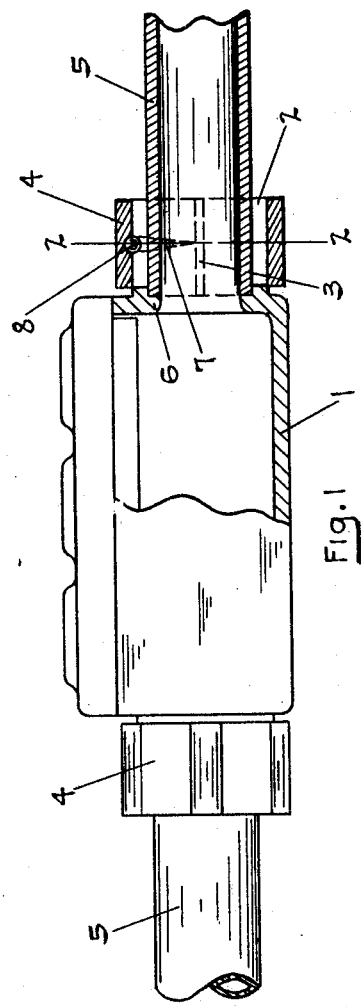
Inventor
John W. Cox
By
Attorney Patented Jan. 29, 1929.

1,700,195

UNITED STATES PATENT OFFICE.

JOHN WILLIAM COX, OF ERIE, PENNSYLVANIA, ASSIGNOR TO ERIE MALLEABLE IRON COMPANY, OF ERIE, PENNSYLVANIA, A CORPORATION OF PENNSYLVANIA.

CONDUIT FITTING.

Application filed February 17, 1925. Serial No. 9,809.

The invention is particularly directed to improvements in conduit fittings which are adapted to secure conduits without the use of screw threads on the conduits. As exemplified this is shown in the form of a conduit box but it will be understood that it includes any of the several fittings which involve the connecting of conduits or the engagement of conduits. In the present structure the conduit is clamped with the fitting. Features and details of the invention will appear from the specification and claims.

The invention is illustrated in the accompanying drawings as follows:—

Fig. 1 shows a side elevation, partly in section, of a conduit box.

Fig. 2 a section on the line 2—2 in Fig. 1.

1 marks the body of the box, and 2 an extension sleeve on the box, this sleeve having slots 3 extending from its outer end inwardly. An annular wall in the form of a ring 4 is arranged around the extension, the ring having a series of flats forming wrench holds by which it may be readily turned.

A conduit 5 is shown in place in the sleeve 2 and engages an inwardly extending shoulder 6 at the inner end of the extension.

The sleeve 2 has a surface 7 which is eccentric to the inner surface of the sleeve and also eccentric to the inner surface of the ring 4. A ball 8 is set in a socket 9 in the ring, this being preferably forced to place so that the ball readily retains its position in the ring. When it is desired to secure a conduit in the extension the conduit is placed within the sleeve, the ring is turned on the sleeve, and the ball acting on the eccentric surface 7 closes or contracts the sleeve 2. At the same time the ball being of comparatively hard material creases or grooves the extension 2 so as to lock the sleeve against axial movement on the extension.

What I claim as new is:—

1. In a conduit fitting, the combination of a contractible sleeve adapted to engage an inserted conduit; an annular wall surrounding the sleeve, opposing portions of the sleeve wall and annular wall having eccentric surfaces; and a ball between the walls engaging and seating in the opposing walls and contracting the sleeve by its engagement as the sleeve and annular wall are rotated relatively to each other.

2. In a conduit fitting, the combination of a contractible sleeve adapted to engage an inserted conduit; an annular wall surrounding the sleeve, opposing portions of the sleeve wall and annular wall having eccentric surfaces; and a ball seated in one wall engaging and seating in the opposite wall and contracting the sleeve by its engagement as the sleeve and annular wall are rotated relatively to each other.

3. In a conduit fitting, the combination of a conduit body having a contractible extension sleeve thereon; a ring surrounding the sleeve, said ring and sleeve having opposing portions of their walls provided with eccentric surfaces; and a ball between said surfaces seating in said surfaces and adapted to contract the sleeve by the rotation of the ring on the extension.

4. In a conduit fitting, the combination of a conduit body having a contractible extension sleeve thereon; a ring surrounding the sleeve, said ring and sleeve having opposing portions of their walls provided with eccentric surfaces; and a ball between said surfaces seating in said surfaces and adapted to contract the sleeve by the rotation of the ring on the extension, said ball being seated in the ring.

In testimony whereof I have hereunto set my hand.

JOHN WILLIAM COX.